US009152167B2

(12) United States Patent
Marotto (10) Patent No.: US 9,152,167 B2
(45) Date of Patent: Oct. 6, 2015

(54) STEERING MEANS FOR VEHICLES, PARTICULARLY SUITABLE FOR USE BY DISABLED PERSONS (75) Inventor: Fulvio Marotto, Treviso (IT)

(73) Assignees: Patrizia Ghedin, Volpago Del Montello (TV) (IT); Innovation Factory SRL, Trieste (IT)

( * ) Notice: Subject to any disclaimer, the term of this patent is extended or adjusted under 35 U.S.C. 154(b) by 100 days.

(21) Appl. No.: 13/642,527

(22) PCT Filed: Apr. 20, 2010

(86) PCT No.: PCT/IB2010/051727
§ 371 (c)(1),
(2), (4) Date: Jan. 2, 2013

(87) PCT Pub. No.: WO2011/132019
PCT Pub. Date: Oct. 27, 2011

(65) Prior Publication Data
US 2013/0098189 A1 Apr. 25, 2013

(51) Int. Cl.
B62K 21/26 (2006.01)
G05G 1/52 (2008.04)
B62K 3/16 (2006.01)
B62K 11/14 (2006.01)
B62K 23/04 (2006.01)
G05G 11/00 (2006.01)

(52) U.S. Cl.
CPC .. G05G 1/52 (2013.01); B62K 3/16 (2013.01); B62K 11/14 (2013.01); B62K 21/26 (2013.01); B62K 23/04 (2013.01); G05G 11/00 (2013.01); Y10T 74/20213 (2015.01); Y10T 74/20256 (2015.01)

(58) Field of Classification Search
USPC ............ 74/480 R, 490.12, 491, 551.8, 551.9; 623/57, 61, 62; 180/315
See application file for complete search history.

(56) References Cited

U.S. PATENT DOCUMENTS 1,711,447 A * 4/1929 Colanduoni ..................... 623/57
3,358,527 A * 12/1967 Lake et al. ................... 74/484 R
3,776,064 A * 12/1973 Rose .............................. 74/557

(Continued)

FOREIGN PATENT DOCUMENTS

DE 8332943 U1 2/1984
DE 102004019499 A1 * 11/2005

OTHER PUBLICATIONS

ISR and Written Opinion in related PCT application PCT/IB2010/051727.

(Continued)

Primary Examiner — Vicky Johnson
(74) Attorney, Agent, or Firm — Kristina Castellano; Castellano PLLC (57) ABSTRACT A steering means for vehicles suitable for use by disabled persons comprises an attachment device for receiving an upper limb of a person who does not have the ability to grasp the steering means. The attachment device comprises a hollow body in which are provided a seat to receive an extremity of the upper limb, a front opening, having an open outline, through which the limb projects when the extremity is received in the seat, a side opening, joined to the front opening, extending along the hollow body to allow the extremity of the limb to be inserted into or removed from the hollow body, respectively, as well as opposing abutment regions shaped and spaced so as to abut the extremity of the limb when the latter is subjected to a torsion movement.

22 Claims, 9 Drawing Sheets

(56) References Cited

U.S. PATENT DOCUMENTS

| | | | |
|---|---|---|---|
| 4,934,024 A | | 6/1990 | Sexton |
| 5,163,966 A | * | 11/1992 | Norton et al. ............... 623/65 |
| 2007/0021841 A1 | * | 1/2007 | Al-Temen et al. ............ 623/25 |
| 2012/0285289 A1 | * | 11/2012 | Walker et al. ............... 74/558 |

OTHER PUBLICATIONS

International Preliminary Report on Patentability in related PCT application PCT/IB2010/051727.

* cited by examiner

STEERING MEANS FOR VEHICLES, PARTICULARLY SUITABLE FOR USE BY DISABLED PERSONS

CLAIM FOR PRIORITY

This application is a U.S. National Stage Application of PCT/IB2010/051727 filed on Apr. 20, 2010, the contents of which are incorporated herein by reference.

TECHNICAL FIELD

The present invention concerns a steering means for vehicles, particularly suitable for use by disabled persons having the characteristics outlined in the preamble of the main claim.

BACKGROUND ART

The present invention has general application in all vehicles that normally require, in order to drive them, the ability of the user to grip with one or both hands upon a handgrip of a suitable steering means, allowing the vehicle to be driven even by disabled persons without this ability, for example following amputation or disablement. The invention has a preferred, but not exclusive, application in motorcycles, and more specifically in motorcycles for motocross, in which greater gripping ability on the vehicle is required.

Generally, in vehicles, the steering means is represented by handlebars or by a steering wheel the movement of which is controlled directly by the user holding it. Moreover, such steering means are typically provided with one or more controls of the vehicle able to be operated directly by the hands of the user while they are gripping onto the steering means. An example of vehicles of this type is represented by a motorcycle, on the steering means of which (the handlebars) are provided special handgrips that can be gripped by the user with which the accelerator is also controlled and whose hands can easily operate the brake or clutch lever. This possibility of controlling the vehicle is, however, obviously does not apply to disabled persons, without the ability to grip with the hand.

In order to at least partially tackle the need to allow conventional vehicles to also be driven by these persons, it is known to provide attachments to secure the free extremity of an upper limb of a user to the handlebars of a motorcycle. Such attachments comprise an open sheath, suitably secured to the handlebars of the motorcycle, in which an extremity of the limb is received: the sheath can also be closed by a binding that holds the extremity of the limb inside the sheath.

Such a solution does, however, have some relevant drawbacks, the first of which resulting from the fact that the binding is a relatively laborious and complicated operation and necessarily requires the use of hands. This, in the case in which the disabled person is incapable of gripping with both hands, means that it is impossible for the person to carry out such an operation without somebody else's help.

A second relevant drawback of the aforementioned known solution is given by its intrinsic lack of safety. Indeed, it should be noted that, once bound to the sheath, the limb is fixedly secured to it, and thus to the vehicle, without the possibility of quickly disengaging it. Therefore, in the case of a fall, the user is inevitably dragged along the ground attached to the motorcycle, with greater danger to his well-being.

A further drawback is given by the fact that devices of this type are not sufficient to ensure that motorcycles can also be driven by disabled persons that are unable to grip with both hands. Indeed, they are not generally studied so as to be able to operate all of the controls of the motorcycle foreseen on conventional handlebars.

DESCRIPTION OF THE INVENTION

The problem forming the basis of the present invention is to provide a steering means for vehicles, suitable for use by disabled persons, structurally and functionally designed to overcome the aforementioned limitations with reference to the cited prior art.

In such a problem a first purpose of the finding is to make a steering means for vehicles that is cost-effective, safe, simple to build and easy to use.

A further purpose of the finding is to provide a steering means for motorcycles in which all of the controls for driving it are carried at the level of the handlebars so as to be controlled even by disabled persons unable to grip with both hands and unable to use their feet.

Moreover, a purpose of the finding is to make a steering means that allows the aforementioned disabled persons to drive even a motorcycle equipped with a sequential gear change, also to compete in motorcycling or motocross competitions.

This problem is solved and these purposes are accomplished by the present finding through a steering means for vehicles, suitable for use by disabled persons, made in accordance with the following claims.

BRIEF DESCRIPTION OF THE DRAWINGS

The characteristics and advantages of the invention will become clearer from the detailed description of some preferred embodiments thereof, illustrated for indicating and not limiting purposes with reference to the attached drawings, in which.

PREFERRED EMBODIMENT OF THE INVENTION

Initially with reference to FIGS. 1 to 6b, reference numeral 1 wholly indicates handlebars of a motorcycle 2, representing a first example embodiment of a steering means for vehicles suitable for use by disabled persons, made in accordance with the present invention.

Figure 1:
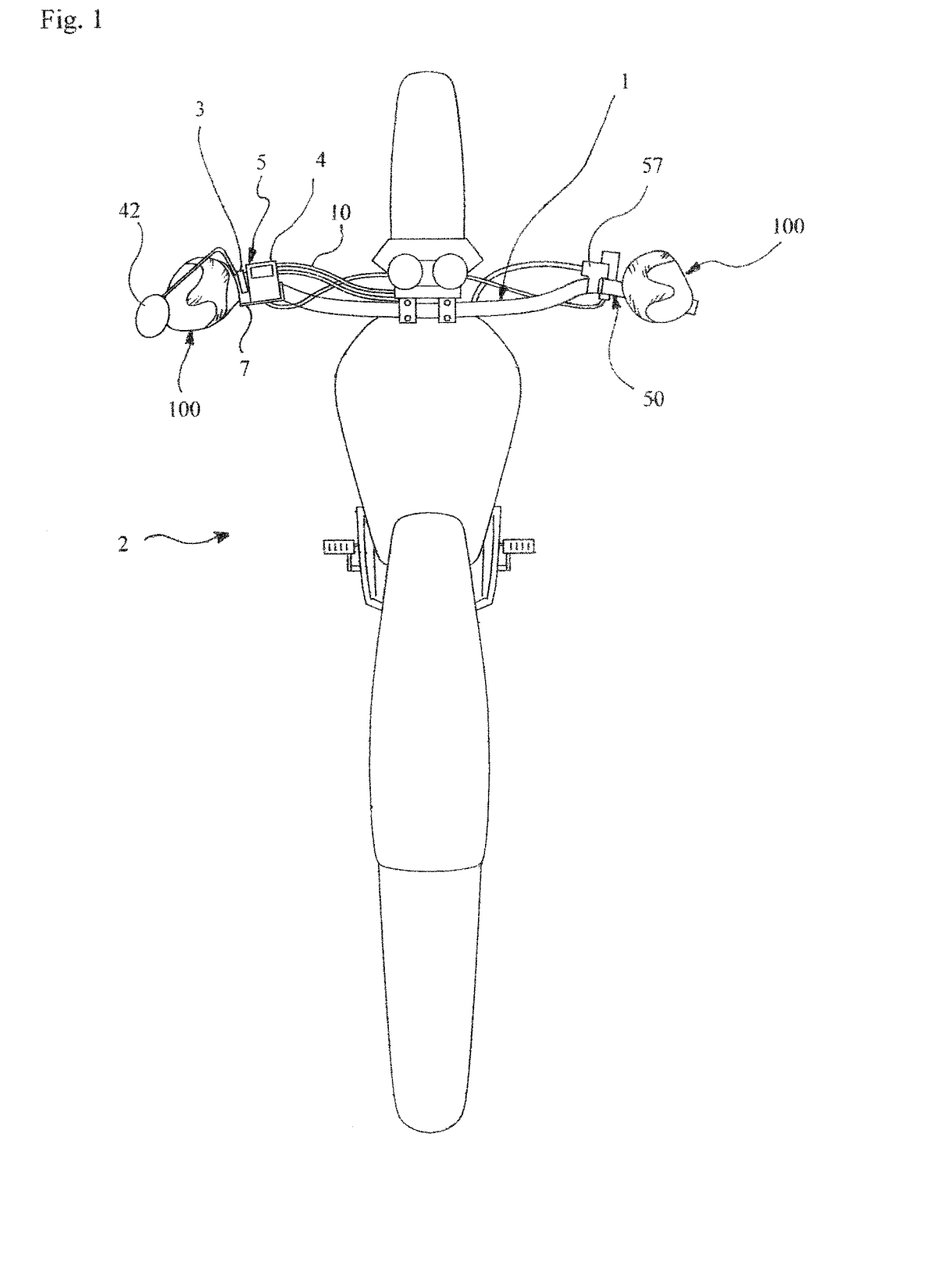
FIG. 1 is a schematic plan view of a motorcycle equipped with handlebars representing a first example of steering means for vehicles made according to the present invention.

The motorcycle 2 is particularly intended for motocross, even though the handlebars 1 can be analogously used on any other type of motor-powered vehicle, on or off-road, which it is foreseen to drive through this type of steering means. Moreover, although with the suitable simplifications and technical modifications, which will all clearly be within the capabilities of the man skilled in the art, it can also be used to ride bicycles and similar vehicles without a motor.

The handlebars 1 conventionally extend along a main longitudinal direction X and at the opposite ends there are, respectively, a left handgrip 7 and a right handgrip 50.

Both of the handgrips 7, 50 are able to rotate around the axis X, in both directions of rotation, starting from a neutral rest position and they can operate the controls necessary to drive the motorcycle 2 through such rotations, as explained better hereafter.

Each handgrip 7, 50 has a respective attachment device 100 securely fixed to it, said device being suitable for receiving an extremity of an upper limb B of a person who does not have the ability to grip with the hand.

Figure 6:
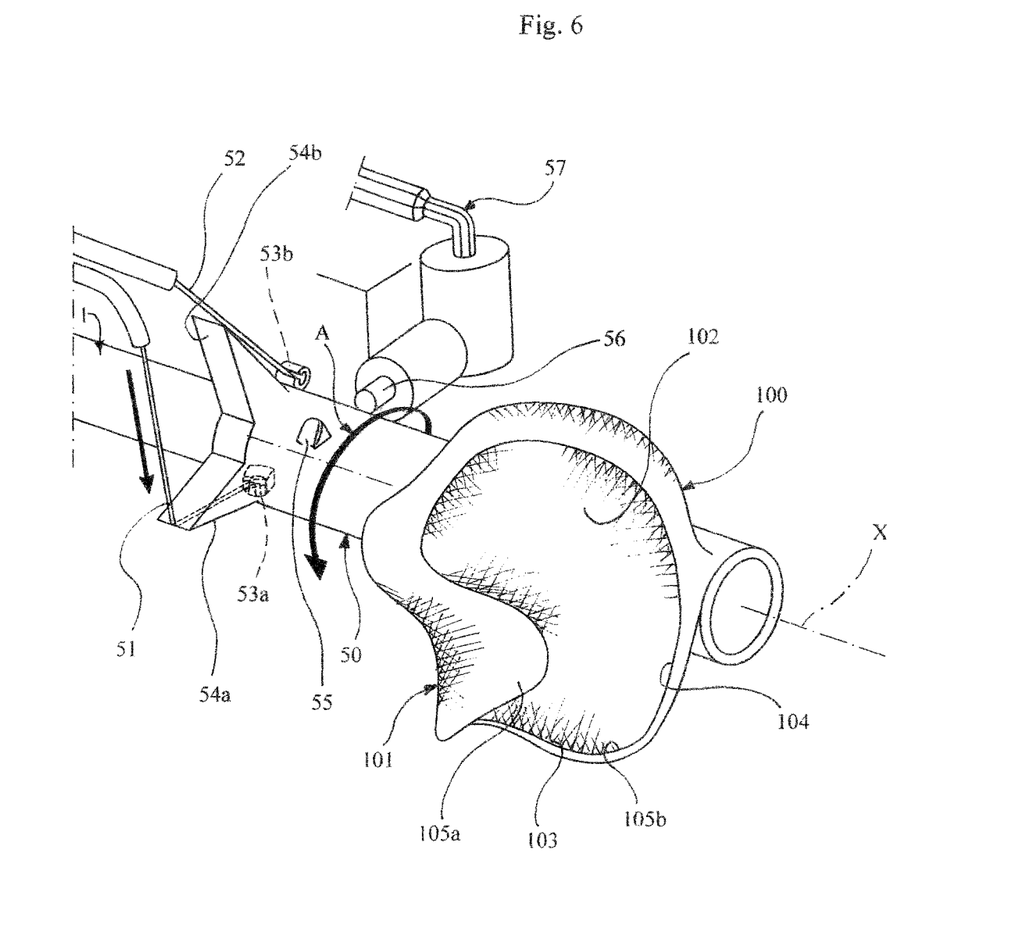
FIG. 6 is a schematic perspective view of a second detail of the handlebars of the motorcycle of FIG. 1, FIGS. 6a and 6b are schematic views of the detail of FIG. 6, in which a limb is illustrated in the position for insertion in the handlebars and, respectively, in a position inserted in the handlebars.
Figure 6A:
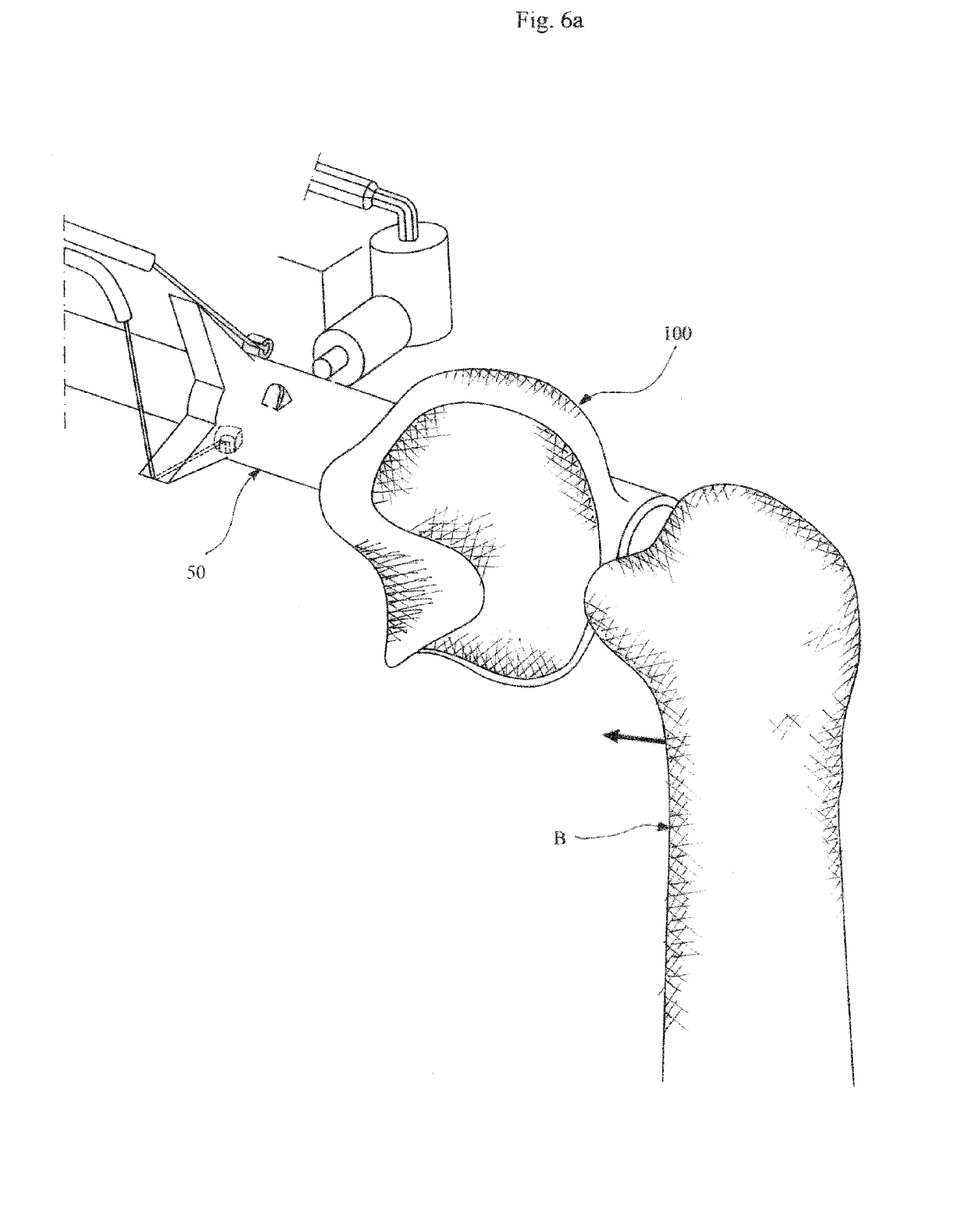
Figure 6B:
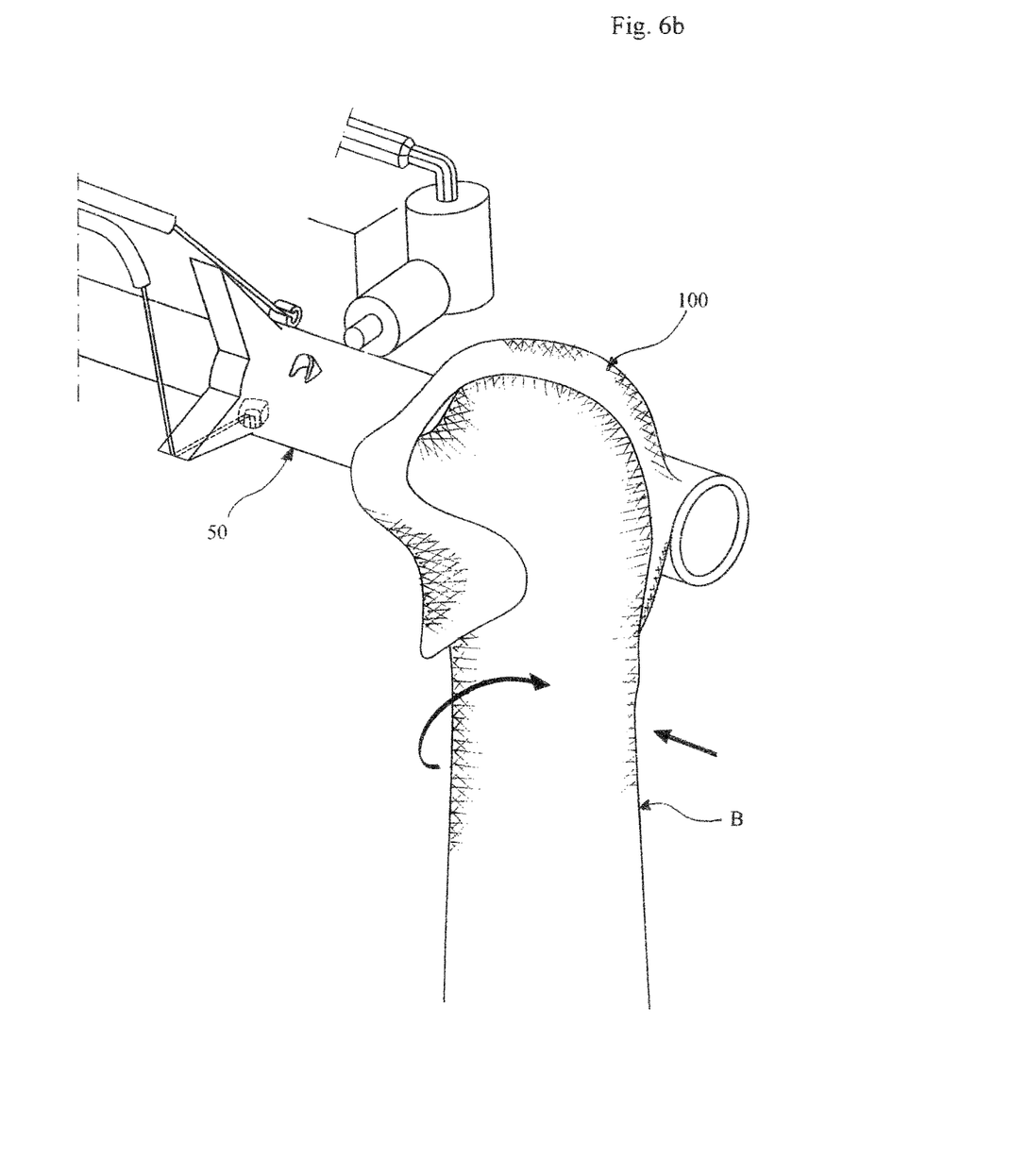

Each attachment device 100 comprises a substantially rigid hollow body 101, in which a seat 102 is formed to receive the extremity of the user's right or left upper limb. The seat 102 is preferably configured so as to adapt to the shape of the extremity of the limb B, but nevertheless it can also not strictly adhere to such a shape provided that it is able to receive it. The hollow body 101 also has a front opening 103, through which the user's limb projects when the respective extremity is received in the seat 102. The front opening 103 has an open outline, and is joined to a side opening 104, extending along the hollow body 101 to allow the extremity of the limb B to be inserted into or removed from the seat 102, respectively.

Preferably, the side opening 104 is formed on an outer side of the hollow body 101, facing the opposite way to the handlebars 1, so as to promote the fast and effective disengagement of the limb from the hollow body 101 when needed.

Formed on the body 101, preferably at the outline of the front opening 103, there are also opposing abutment regions 105a, 105b that are shaped and spaced so as to abut the extremity of the limb B when the latter is subjected to a torsion movement by the user (FIG. 6b). In particular, the outline of the front opening 103 is pocket-shaped, with a generically C-shaped profile, elongated going away from the side opening 104.

It should be noted that the secure coupling of the upper limb B to the attachment device 100 requires a specific movement by the user and thus a high degree of intent, similarly to what occurs in the voluntary grip of a handgrip by a user capable of grasping it.

The effectiveness of the required movement is based on the fact that the wrist of forearm of an upper limb, even if partly or totally missing the fingers or the entire hand, has a structure that is not perfectly cylindrical. In this way it is thus possible to gain access to the seat 102 of the hollow body 101 through the side opening 104, projecting from the front opening 103 without interfering with the abutment surfaces 105a, 105b and thereafter, with a torsion movement of the wrist or forearm, to press with it against such abutment surfaces, locking the extremity of the upper limb B held inside the seat 102 (see FIGS. 6a, 6b). It should be noted that, for the abutment against the surfaces 105a, 105b, the asymmetric nature of the bone structure involved, for example of the ulna and radius, can be advantageously exploited.

It should be appreciated that, in this way, the insertion of the extremity of the upper limb B into the attachment device 100 is quick, simple and does not need any operation requiring outside intervention. Moreover, the coupling between the user's limb and the attachment device requires a voluntary movement of the user and can be disengaged at any moment and very quickly. For this purpose, the presence of the side opening 104, as well as providing easy access to the seat 102, also represents a quick escape route from the hollow body 101 in the case in which it is necessary to quickly detach oneself from the handlebars 1, for example in the case of the motorcycle 2 falling.

In the preferred example described here, it is foreseen for the handlebars 1 to comprise a respective attachment device 100 both for the right handgrip 50 and for the left handgrip 7 and for both to be suitably arranged to allow the different driving controls to be operated with just rotation movements, as described in the following paragraphs. In this configuration, the motorcycle 2 can be advantageously driven by a disabled person who is unable to grasp with both hands. Nevertheless, it is foreseen for it to be possible to prepare handlebars equipped with a single attachment device 100 in the case in which the user only has a functional disability in one of his hands.

The right handgrip 50 of the handlebars 1 is preferably arranged to control the accelerator and the front brake of the motorcycle 2, whereas the left handgrip 7 is preferably arranged to control the change in the transmission ratio, the clutch and the back brake of the motorcycle 2.

The handgrip 50 preferably has a first cable 51 that controls the opening of the fuel distribution valve and a second cable 52 that controls its closing, as further means that ensures the deceleration of the motorcycle 2, connected to it.

Preferably, both of the cables 51, 52 are secured to the respective extremities on stops 53a and 53b secured to the handgrip 50, and they are tensioned by rotating the handgrip 50 around the axis X, from a neutral position, in one direction, for example the one indicated by the arrow A in FIG. 6, and in the opposite direction, respectively.

The handgrip 50 is also provided with appendages 54a, 54b that can engages the cables 51, 52 when tensioned.

In particular, the appendages 54a, 54b are preferably pyramid-shaped, projecting from the handgrip 50 and they have the function of increasing the travel of the respective cables 51, 52 for the same angular excursion made by the handgrip 50 in its rotation movement. Preferably, the engagement of the appendages with the respective cables is obtained only after a first rotation passage of the handgrip 50, so that the action of amplifying the travel of the cable only occurs after a first passage.

The handgrip 50 also has a projection 55 formed on it, able to operate a piston 56 operating a hydraulic circuit 57 for controlling a front brake of the motorcycle 2.

The projection 55 is arranged so as to abut the piston 56 when the handgrip 50 is rotated in the opposite direction to the direction A for making the fuel distribution valve open. In this way, in order to apply the front brake it is necessary to cause the deceleration of the motorcycle 2.

Figure 2:
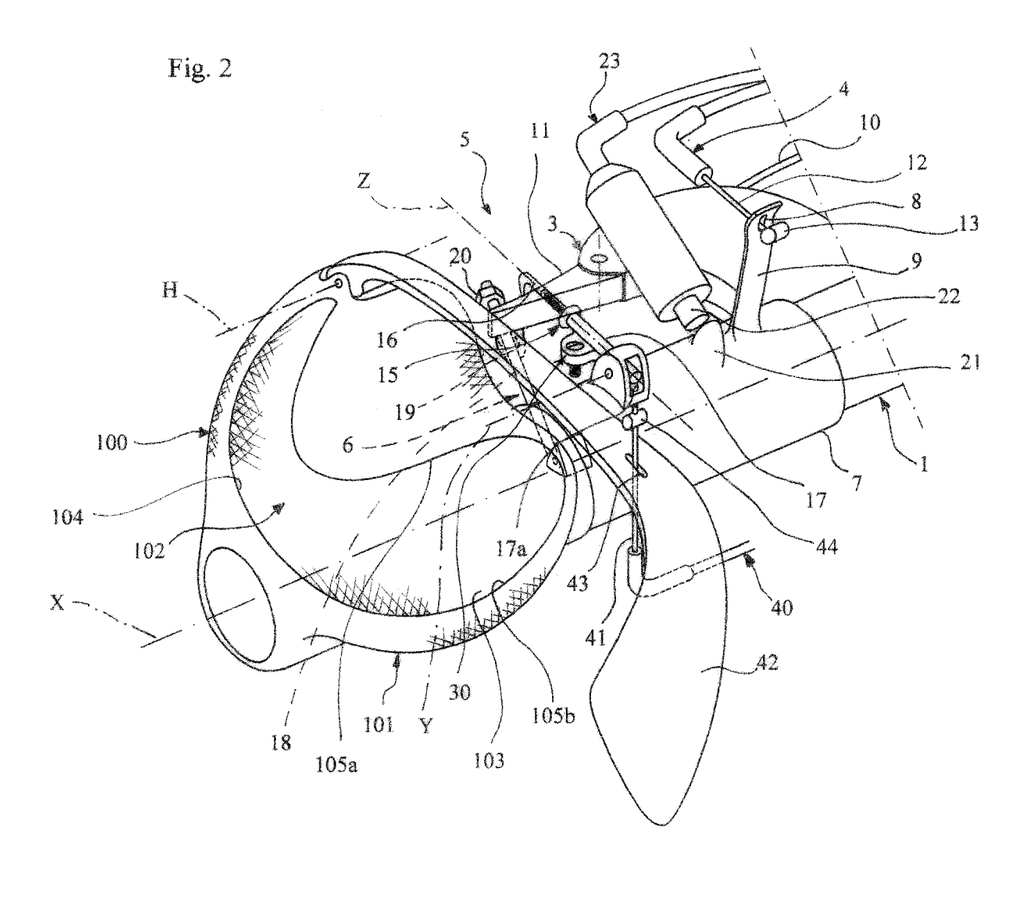
FIG. 2 is a schematic perspective view of a first detail of the handlebars of the motorcycle of FIG. 1, in a first operating position
Figure 3:
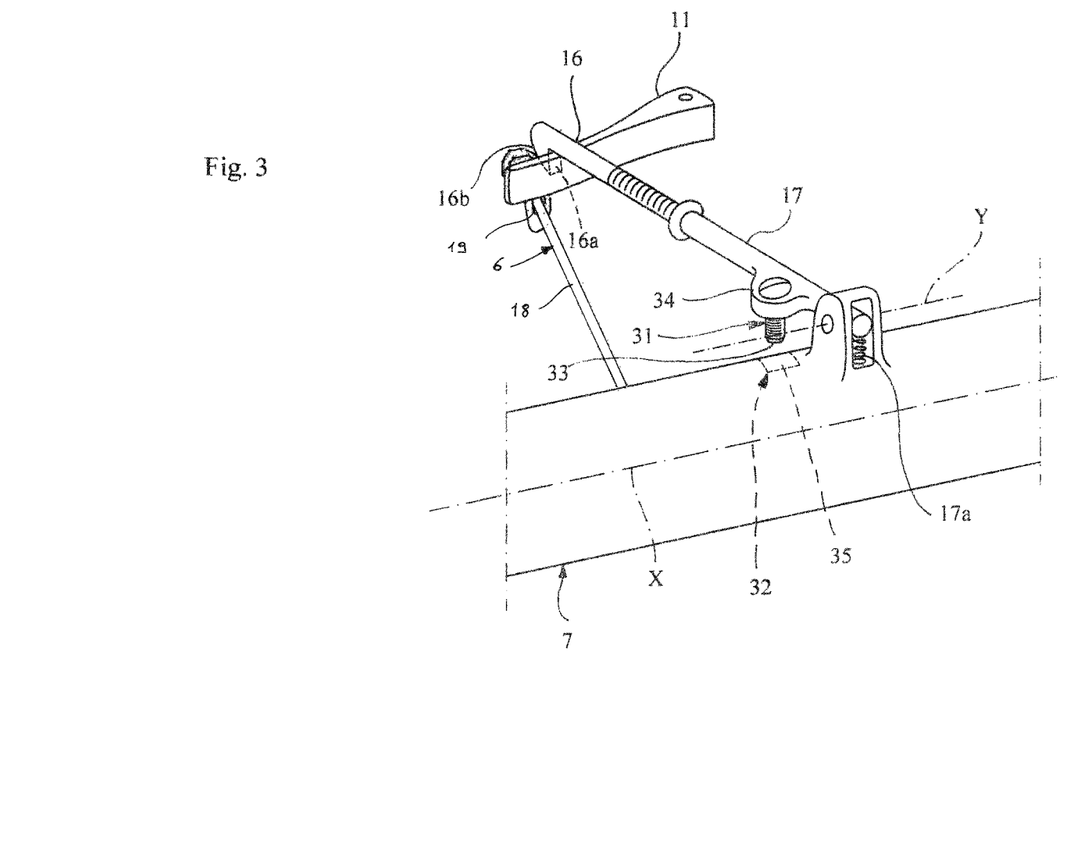
FIGS. 3 to 5 are schematic partial views of some features of the detail of FIG. 2 in respective and different operating positions.

The handlebars 1 are also provided with a device 5 for controlling the change in transmission ratio of the motorcycle 2, which can be controlled with just the rotation movement of the handgrip 7.

The gear change of the motorcycle 2 is of the sequential type and comprises a first control element of the clutch 3, a first control element for the gear change 4, mechanically connected together by the handgrip 7.

The first control element of the clutch 3 can be moved towards an operating position in which the clutch is disengaged, whereas, analogously, the first control element for the gear change 4 can be moved towards an operating position in which the transmission ratio immediately above the one in use at the moment of the gear change is inserted.

According to a further advantageous aspect of the present invention, the handgrip 7 can be moved in rotation around the axis X from a neutral or rest position towards a gear change operating position, and, thanks to the specific mechanical connection with the first control elements of the clutch and gear change 3, 4, such a single movement causes their simultaneous movement towards the respective operating positions. In particular, it is foreseen, during the movement of the handgrip 7 towards the gear change io operating position, for the first control element for the gear change 4 to reach its own operating position after the operating position has been reached by the first control element of the clutch 3.

The handgrip 7 can be seen as an actuator control of the first control elements of the clutch and gear change 3, 4.

The first control element of the clutch 3 comprises a cable 10, connected as a first end thereof to the clutch and, at its opposite end, secured to a lever 11 that is articulated on to the handlebars 1 and which can be pivoted with respect to them to tension the cable 10 and disengage the clutch.

As an alternative to the cable 10, it is foreseen for the lever 11 to act on a hydraulic circuit for controlling the clutch.

In turn, the first control element for the gear change 4 comprises a cable 12, connected at a first end thereof to the gear change of the motorcycle 2 and engaged, with easy sliding, at an opposite end thereof, with the handgrip 7.

In particular, the cable 12 passes through an eyelet 8 formed on a tab 9 extending radially from the handgrip 7 and is equipped with a one-way stop element 13 able to abut the tab 9 to prevent the cable 12 from slipping out from the eyelet 8.

The lever 11 for tensioning the cable 10 is mechanically connected to the handgrip 7 through hooking means 15, which comprise a hook 16, mounted on the handgrip 7 so as to pivot around an axis Y substantially parallel to the main axis X. The hook 16 extends along a longitudinal axis Z, substantially perpendicular to the axis X, and it is able to hook the lever 11 and make it pivot so as to tension the cable 10 when the handgrip 7 is moved towards the gear change operating position.

The hook 16 comprises a tooth 16a, able to engage the lever 11, which has a front 16b, opposite the lever 11, and advantageously tilted with respect to the axis Z.

The hook 16 is also advantageously screwed onto a rod 17, directly secured in a pivoting manner onto the handgrip 7 so as to allow the distance between the hook 16 and the actuator control 5 to be adjusted.

A spring mechanism 17a is also preferably arranged between the rod 17 and the handgrip 7 so as to bias the hook 16 in hooking engagement with the lever 11.

The handlebars 1 are also provided with release means 30 of the first control element of the clutch 3, which comprise a first and a second abutment element 31, 32 respectively associated with the hook 16 and the handgrip 7, capable of interacting with one another following the rotation of the handgrip 7 towards the gear change operating position, in order to pivot the hook 16 around the axis Y disengaged from the lever 11, overcoming the elastic action offered by the spring mechanism 17a.

In particular, the release means 30 are arranged and adjusted so as to cause the first control element of the clutch 3 to be released, when the first control element for the gear change 4 reaches the respective operating position following the rotation of the handgrip 7 into the gear change operating position.

According to a preferred embodiment, the first abutment element 31 comprises a pin 33, extending substantially perpendicular to the axis Z of the hook 16, which is suitably screwed onto a perforated tab 34 extending from the rod 17.

The second abutment element comprises an area 35 defined on the handgrip 7, corresponding to the abutment point of the pin 33 on the handgrip itself.

Thanks to the screwing engagement, the pin 33 extends from the rod 17 by an adjustable amount, so as to modify the moment when the hook 16 is pivoted to disengage from the lever 11.

The handlebars 1 are also advantageously provided with a second control element of the clutch 6, which is able to pivot the lever 11 towards its own operating position when the handgrip 7 is rotated, from the neutral position, in the opposite direction with respect to the gear change operating position.

In particular, the second control element of the clutch 6 comprises a threaded rod 18, mounted in a pivoting manner on the handgrip 7 on the opposite side with respect to the hook 16, which is slidingly engaged in a hole 19 formed on a tab extending from the lever 11. The rod 18 can slide inside the hole 19, but it is prevented from slipping out from it by a stop member 20, screwed onto the rod 18 on the opposite side to the handgrip 7 with respect to the hole 19.

In this way the rod 18 does not interfere with the lever 11 when the handgrip 7 is rotated towards the gear change operating position, but, on the other hand, when the handgrip 7 is rotated in the opposite direction, the lever 11 is abutted by the stop member 20 and pivoted towards its own operating position for disengagement of the clutch.

The handlebars 1 also comprises a second control element for the gear change 40 that can be moved into a respective operating position to insert a lower transmission ratio to the one in use at the moment of the gear change, or else to insert the first gear.

In greater detail, the second control element for the gear change 40 comprises a cable 41 engaged, at an opposite end thereof to the gear change of the motorcycle 2, in a lever 42 that is mounted on the handlebars 1 so as to tension the cable 41 when made to pivot.

Similarly to the cable 10, the cable 41 is also slidingly engaged in an eyelet 43 formed on the lever 42 and it is equipped with a stop member 44 to prevent the cable 41 from slipping out from the eyelet 43.

The lever 42 is secured in articulation onto the handlebars 1, preferably directly onto the attachment device 100, at its first end to pivot around an axis H substantially parallel to the axis X. Moreover, the lever 42 preferably extends towards a forearm area of the user of the motorcycle 2, so that the lever 42 can be made to pivot through a movement of the forearm of the user himself.

Similarly to the handgrip 50, the handgrip 7 also has a projection 21 formed on it, capable of operating a piston 22 for operating a hydraulic circuit 23 for controlling a brake of the motorcycle 2, in this case the back brake.

The projection 21 is arranged so as to abut the piston 22 when the handgrip 7 is rotated, from the neutral rest position, in the opposite direction with respect to the gear change operating position. Consequently, the same rotation movement of the handgrip 7 leads to both the operation of the back brake and the movement of the lever 11 towards the operating position of disengagement of the clutch.

It should be noted that in this way the motor of the motorcycle is prevented from switching off when braking is completed.

The use of the handlebars 1 foresees the insertion of the extremities of the user's upper limbs into the attachment devices 100 fixed to the handgrips 7, 50, as already described earlier.

Through the attachment devices 100, it is possible both to manoeuvre the handlebars 1 and to make the respective handgrips 7, 50 rotate around the axis X, in either direction, as a function of the driving controls to be operated.

In particular, starting off from a stopped condition is carried out from a position in which the handgrip 7 is rotated in the opposite direction with respect to the gear change operating position, in which the back brake is applied and the clutch is disengaged. Once the first gear has been inserted through pivoting of the lever 42, the gradual acceleration carried out by rotating the handgrip 50 will correspond to the rotation of the handgrip 7 towards the neutral rest position, in this way slowly releasing the clutch and the back brake and allowing the motorcycle 2 to move forward. During normal operation of the motorcycle 2, the handgrip 7 is in neutral rest position (FIGS. 2, 3), with the lever 11 in a position spaced from the handgrip 7, so that the clutch is in engaged position, and with the hook 16 hooked to it.

The change in transmission ratio from first to second gear, and thereafter to a higher gear, foresees, after having released the accelerator, the simple rotation of the handgrip 7 from the neutral rest position towards the gear change operating position.

Figure 4:
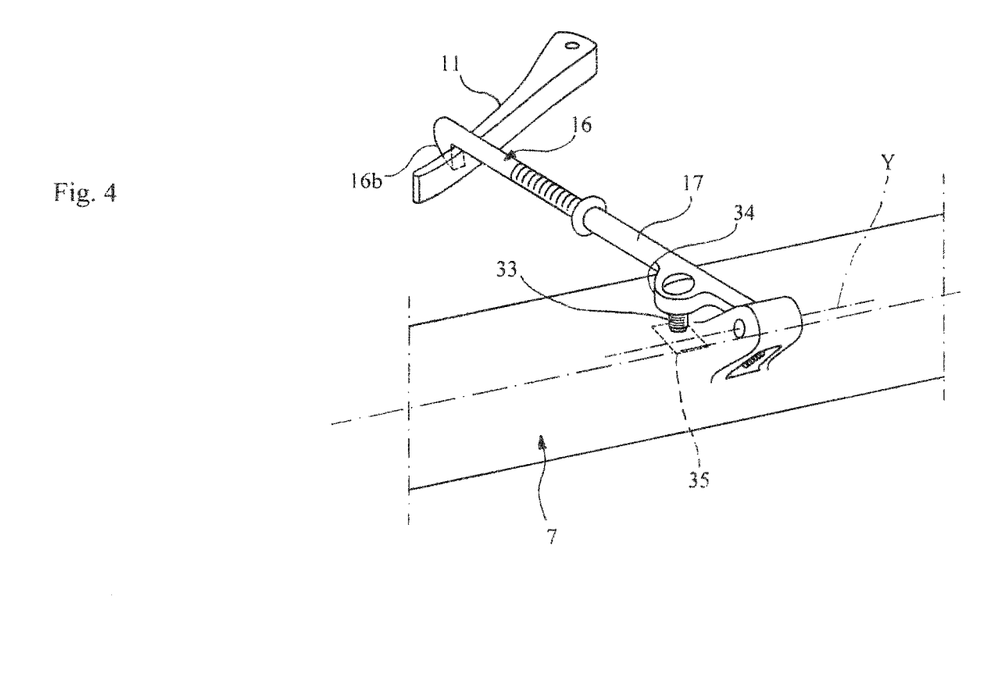

Due to the rotation, the lever 11 is pivoted by the hook 16 and consequently the cable 10 is tensioned until its own operating position is reached, causing the disengagement of the clutch (FIG. 4).

Again during the rotation of the handgrip 7, the cable 12 is tensioned by the radial tab 9, thanks to the abutment offered by the one-way stop element 13.

Advantageously, the engagement of the cable 12 with respect to the tab 9 is carried out so that the operating position of the first control element for the gear change 4 is reached, and consequently the higher transmission ratio is inserted, at a time immediately after the disengagement of the clutch.

For this purpose both the length of the cable 12 and the positioning of the lever 11 relative to the handgrip 7 can be suitably adjusted.

Figure 5:
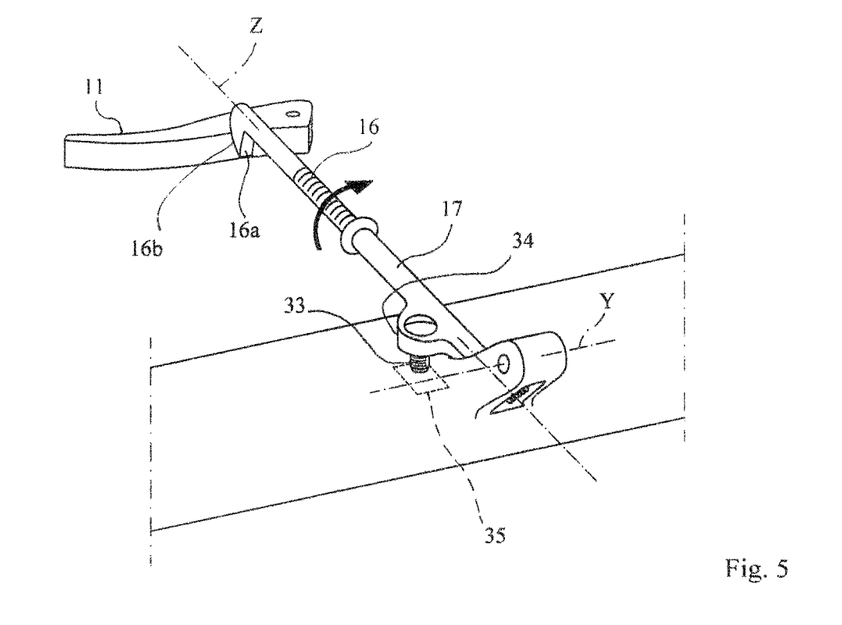

By continuing to rotate the handgrip 7 the release means 30 are operated, with consequent disengagement of the lever 11 from the hook 16 and engagement of the clutch (FIG. 5).

Such disengagement is brought about by the abutment of the pin 33 with the surface of the handgrip 7 caused by the rotation movement of the latter.

In particular, the pin 33 extends towards the handgrip 7 by a suitably adjusted amount so as to cause the lever 11 to be released at a time immediately after the insertion of the transmission ratio given by the cable 12.

In this way, with a single and simple rotation movement of the handgrip 7, the clutch is disengaged, the higher transmission ratio is inserted and the clutch is engaged at times immediately following one another.

The rotation of the handgrip 7 in the opposite direction, to go back to the neutral rest position illustrated in FIG. 2, causes the hook 16 to hook back onto the lever 11—and operation that is advantageously promoted by the inclination of the front 16b of the hook 16.

When it is required to insert a lower transmission ratio, it will be sufficient, following prior release of the handgrip 50 for controlling the accelerator, to operate the left forearm so as to pivot the lever 42 with respect to the handle 100.

The insertion of the lower transmission ratio takes place without disengaging the clutch.

It should be noted that the handlebars 1 can be advantageously used also be users capable of grasping the handgrips 7, 50, by modifying or, at the limit, eliminating the attachment devices 100.

Also in this hypothetical case the handlebars 1 have substantial advantages, since, carrying all of the controls of the motorcycle 2 at the level of the handlebars, said motorcycle can be advantageously driven by a person whose does not have full functionality of his feet. Preferably, in this case, the handgrip 7, 50 will have a longitudinal projection, not interfering with the position of the thumb, and projecting radially from the generally cylindrical surface of the handgrip, on which the part of the palm of the hand beside the wrist can rest. In this way, the action of rotating the handgrip is made easier, consequently making the different controls operated by it quicker and simpler to manage.

Figure 7:
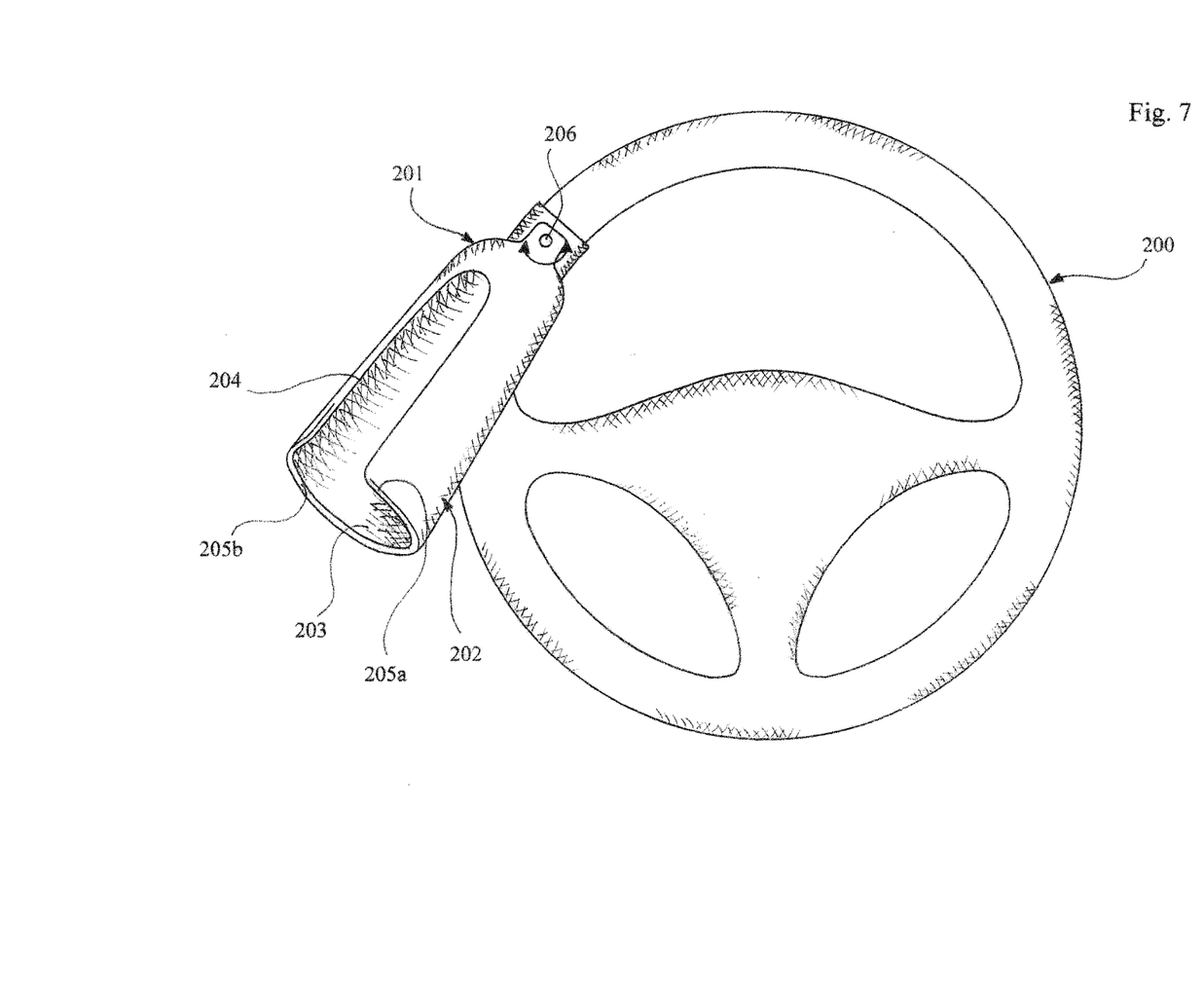
FIG. 7 is a schematic view of a steering wheel representing a second example of steering means for vehicles made according to the present invention.

FIG. 7 represents a second embodiment of the present invention. In this case the steering means is represented by a steering wheel 200, adapted for example for driving a per sé conventional automobile and thus not represented in the attached figures, on which an attachment device 201 is fixed to allow the steering wheel 200 to be controlled by a disabled person who in unable to grip with a hand. The attachment device 201 is substantially analogous to the attachment device 100 of the previous io example, comprising a hollow body 202, able to be accessed through a front opening 203 and a side opening 204 joined together, and opposing abutment regions 205a, 205b that the user can engage through torsion of the forearm to keep a firm grip inside the hollow body 202. It should be noted, however, that the shape of the hollow body 202 is slightly different to that of the attachment device 100, since it is more tapered and elongated. In this example, indeed, the attachment device has been prepared for a person lacking a hand, whereas the attachment device 100 has been prepared for a person substantially lacking fingers. Despite the difference in shape, particularly adapted to the morphology of the extremity of the upper limb of the user, the two attachment devices keep the same structural and functional characteristics, so that the attachment device 100 can be foreseen on a steering wheel and the attachment device 201 can be foreseen on handlebars.

The attachment device 201 is fixed to the steering wheel 200 at an end thereof opposite the front opening 203 through a binding 206 that, unlike the attachment device 100, allows the free rotation of the attachment device 201 with respect to the steering wheel 200 around an axis passing through the binding 206.

In this way it is made easier to rotate the steering wheel 200.

In the case in which the attachment device 201 is mounted on handlebars of a motorcycle it is foreseen for it to be limitedly rotatable with respect to the corresponding handgrip.

The present invention thus solves the aforementioned problem with reference to the quoted prior art, at the same time offering numerous other advantages, including the possibility of driving a vehicle equipped with steering wheel or handlebars, like a bicycle or a motorcycle.

In the latter case, moreover, since all of the controls are carried at the level of the handlebars, such a possibility is also valid for a motorcycle with sequential gear change and it is available also to users with functional disabilities in both the hands and the feet.

A further advantage is given by the fact that it is possible to change gears with a single simple movement, avoiding the drawbacks linked to the relative complexity of the operations to be carried out to insert a higher or lower gear in a conventional motorcycle with sequential gear change, which can lengthen the times without acceleration while the motorcycle travels, or else, if carried out too quickly and with insufficient skill, they can also lead to errors in gear insertion.

Moreover, by suitably adjusting the various control elements and their connection to the actuator control, it is possible to carry out the gear change in very short time periods.

The invention claimed is:

1. Steering means for vehicles, suitable for use by disabled persons, comprising
a handlebar provided on at least one extremity with a rotatable handgrip,
an attachment device attached to the rotatable handgrip to control rotation of said handgrip and arranged to receive an upper limb of a person who does not have the ability to grasp said steering means, wherein said attachment device comprises a substantially rigid hollow body in which are provided:
a seat to receive an extremity of said upper limb,
a front opening, having an open outline, through which said limb projects when the extremity is placed in said seat,
a side opening joined to said front opening extending along said hollow body to allow said extremity to be inserted into or removed from said hollow body respectively, and
opposing abutment regions shaped and spaced so as to abut the extremity of the limb when the latter is subjected to a torsion movement, wherein said attachment device is attached to a handgrip controlling a brake or an accelerator for said vehicle, said handgrip comprising means for controlling the brake or the accelerator, which can be operated by rotating said handgrip.

2. The steering means according to claim 1, wherein said abutment regions are located in correspondence with said open outline of the front opening.

3. The steering means according to claim 1, wherein said brake steering means comprise a projection made on said handgrip, said projection being capable of coming into abutment with a piston operating a hydraulic circuit of said brake when said handgrip is rotated.

4. The steering means according to claim 1, wherein said brake steering means are operated by rotation of said handgrip in a direction opposite to the rotation through which said accelerator is caused to open.

5. The steering means according to claim 1, wherein said handgrip is connected to a first cable which is capable of being tensioned by rotation of said handgrip to control the opening of a fuel delivery valve for said vehicle, a first appendage extending from said handgrip to engage said first cable and amplify its travel when tensioned by rotation of said handgrip.

6. The steering means according to claim 5, wherein said handgrip is connected to a second cable which is capable of being tensioned by rotation of said handgrip in a direction opposite to that required for tensioning the first cable, in order to cause the fuel delivery valve to close.

7. The steering means according to claim 6, wherein a second appendage extends from said handgrip to engage said second cable and amplify its travel when tensioned by rotation of said handgrip.

8. The steering means according to claim 1, wherein said attachment device is attached to a handgrip on which provision is made for a device controlling the change in the transmission ratio of said vehicle which can be operated by rotation of said handgrip.

9. The steering means according to claim 8, wherein said device controlling the change in transmission ratio comprises:
a first control element of the clutch of said vehicle which can be moved into an operating position in which said clutch is disengaged,
a first control element for the gear change of said vehicle which can be moved into an operating position in which a higher transmission ratio is engaged,
said first control elements for the clutch and the gear change being mechanically connected together by means of said handgrip which can be moved in rotation from a neutral position to a gear change operating position to move both of said first elements controlling the clutch and the gear change to their corresponding operating positions in the course of said rotation.

10. The steering means according to claim 9, wherein during rotation of said handgrip towards said gear change operating position, the operating position of said first control element of the gear change is reached after the operating position of said first control element of the clutch.

11. The steering means according to claim 9, wherein said first control element of the clutch comprises a cable connected to said clutch and secured to a lever which can be pivoted with respect to said handlebars to tension said cable, means for hooking said lever which comprise a hook which can be pivoted with respect to said handgrip and capable of pivoting said lever following rotation of said handgrip being mounted on said handgrip.

12. The steering means according to claim 11, wherein a second clutch control element which can move said clutch lever back and forth when said handgrip is rotated from said neutral position in a direction opposite to said gear change operating position is mounted on said handgrip.

13. The steering means according to claim 12, wherein said second control element of the clutch comprises a rod movably engaged in a hole provided in said clutch lever and a stop member secured to said rod on the side opposite said handgrip.

14. The steering means according to claim 11, wherein the distance between said hook and said handgrip can be adjusted.

15. The steering means according to claim 9, wherein release means of said first control element of the clutch arranged so as to disengage the same from said handgrip when said first control element of the gear change reaches the corresponding operating position following rotation of said handgrip are provided on said handgrip.

16. The steering means according to claim 15, wherein said release means comprise a first and second abutment elements associated with said hook and said handgrip respectively, said first and second abutment elements interacting following rotation of said handgrip to pivot said hook in disengagement from said lever.

17. The steering means according to claim 16, wherein said first abutment element comprises a pin extended which to some extent adjustably, towards said handgrip in a manner substantially perpendicular to a longitudinal axis of said hook.

18. The steering means according to claim 9, wherein said first control element of the gear change comprises a cable of which one extremity is secured to said handgrip, with the ability to slide, and at said extremity has a one-way stop element to prevent said cable from becoming unthreaded from said handgrip.

19. The steering means according to claim 9, wherein provision is made for a second control element for the gear change for said vehicle which can be moved in an operating position to control the engagement of a lower transmission ratio, said second gear change control element comprising a cable of which one extremity is engaged in a lever mounted on said attachment device which can be pivoted to tension said cable, said lever extending towards said upper limb in order to be controlled in pivoting movement by said upper limb.

20. The steering means according to claim 9, wherein means for controlling a brake for said vehicle, which can be controlled following rotation of said handgrip from said neutral position in a direction opposite to said gear change operating position, are provided on said handgrip.

21. The steering means according to claim 1, wherein said vehicle is a motorcycle.

22. The steering means according to claim 1, wherein said steering means is a steering wheel and said attachment device is rotatably mounted on said steering wheel.

\* \* \* \* \*